US008168309B2

(12) United States Patent
Choe et al.

(10) Patent No.: US 8,168,309 B2
(45) Date of Patent: May 1, 2012

(54) PERPENDICULAR RECORDING MEDIA WITH SUBLAYERS OF OXIDE DOPANT MAGNETIC MATERIALS

(75) Inventors: Gunn Choe, San Jose, CA (US); Mohammad T. Mirzamaani, San Jose, CA (US); Kai Tang, San Jose, CA (US); Jinliu Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 243 days.

(21) Appl. No.: 12/540,397

(22) Filed: Aug. 13, 2009

(65) Prior Publication Data

US 2011/0038079 A1    Feb. 17, 2011

(51) Int. Cl.
*G11B 5/66* (2006.01)
*G11B 5/673* (2006.01)

(52) U.S. Cl. ............. 428/827; 428/829; 428/836.2

(58) Field of Classification Search .......... None
See application file for complete search history.

(56) References Cited

U.S. PATENT DOCUMENTS

| | | | |
|---|---|---|---|
| 5,478,661 A | 12/1995 | Murayama et al. | |
| 6,511,761 B1 | 1/2003 | Tanahashi et al. | |
| 6,730,421 B1 | 5/2004 | Kirino et al. | |
| 7,060,375 B2 | 6/2006 | Lee et al. | |
| 7,226,674 B2 | 6/2007 | Koda et al. | |
| 7,311,983 B2 | 12/2007 | Watanabe et al. | |
| 7,429,427 B2 | 9/2008 | Wu et al. | |
| 7,601,445 B2 * | 10/2009 | Iwasaki et al. | 428/836.2 |
| 7,862,913 B2 * | 1/2011 | Bian et al. | 428/829 |
| 7,867,638 B2 * | 1/2011 | Sakawaki et al. | 428/829 |
| 2005/0058855 A1 * | 3/2005 | Girt | 428/694 TS |
| 2005/0181237 A1 | 8/2005 | Kitakami et al. | |
| 2006/0121319 A1 * | 6/2006 | Wu et al. | 428/836.2 |
| 2006/0139799 A1 * | 6/2006 | Wu et al. | 360/97.03 |
| 2006/0154113 A1 * | 7/2006 | Watanabe et al. | 428/836.2 |
| 2006/0222902 A1 | 10/2006 | Mukai | |
| 2006/0234091 A1 | 10/2006 | Racine et al. | |
| 2006/0286414 A1 | 12/2006 | Racine et al. | |
| 2006/0289294 A1 | 12/2006 | Racine et al. | |
| 2007/0042227 A1 | 2/2007 | Iwasaki et al. | |
| 2008/0084632 A1 | 4/2008 | Shimizu | |
| 2008/0096053 A1 | 4/2008 | Bian et al. | |
| 2008/0138662 A1 | 6/2008 | Berger et al. | |
| 2008/0199733 A1 | 8/2008 | Oka | |
| 2008/0220157 A1 | 9/2008 | Takenoiri et al. | |
| 2008/0254324 A1 | 10/2008 | Berger et al. | |
| 2009/0052074 A1 * | 2/2009 | Nakagawa et al. | 360/39 |

FOREIGN PATENT DOCUMENTS

WO 2006046732 A1 5/2006
WO 2006134952 A1 12/2006

\* cited by examiner

*Primary Examiner* — Kevin Bernatz

(57) ABSTRACT

Perpendicular recording media with sublayers of dual oxide dopant magnetic materials are disclosed. The magnetic layer may comprise multiple sublayers of magnetic materials. In each sublayer, dual oxide dopants are incorporated. The compositions of the sublayers can be the same or different depending on the application. The magnetic layer may be deposited using a target comprising a mixture of CoPtCrB and dual oxides as dopants. The layer deposited with such targets can be the entire magnetic layer or a sublayer.

18 Claims, 3 Drawing Sheets

| Medium with B-doped Dual Oxide Dopant | |
|---|---|
| Carbon Overcoat | 69 |
| CoPtCrB | 67 |
| Exchange Control Layer | 65 |
| CoPt18Cr17B3-1(Ta2O5)-5(SiO2) Dual Oxide Dopant Magnetic Layer | 63 |
| Underlayer III Underlayer II Underlayer I | 61 |
| Seed layer II Seed layer I | 59 |
| SUL | 55 |
| Ru | 57 |
| SUL | 55 |
| Adhesion | 53 |
| Sub | 51 |

50

Medium with Sublayers of Dual Oxide Dopant

| Layer | Ref |
|---|---|
| Carbon Overcoat | 49 |
| CoPtCrB | 47 |
| Exchange Control Layer | 45 |
| CoPt18Cr18-1(Ta2O5)-5(SiO2) | 43 |
| CoPt18Cr18-1(Ta2O5)-5(SiO2) | 43 |
| Underlayer III | 41 |
| Underlayer II | 41 |
| Underlayer I | 41 |
| Seed layer II | 39 |
| Seed layer I | 35 |
| SUL | 37 |
| Ru | 35 |
| SUL | 33 |
| Adhesion | 31 |
| Sub | |

FIG. 2

Dual Oxide Dopant Medium

| Layer | Ref |
|---|---|
| Carbon Overcoat | 25 |
| CoPtCrB | |
| Exchange Control Layer | |
| Single Oxide Dopant Magnetic Layer | 27a |
| Dual Oxide Dopant Magnetic layer | 27b |
| Underlayer III | |
| Underlayer II | |
| Underlayer I | |
| Seed layer II | |
| Seed layer I | |
| SUL | |
| Ru | |
| SUL | |
| Adhesion | |
| Sub | |

FIG. 1 (Prior Art)

Medium with B-doped Dual Oxide Dopant

| | |
|---|---|
| Carbon Overcoat | 69 |
| CoPtCrB | 67 |
| Exchange Control Layer | 65 |
| CoPt18Cr17B3-1(Ta2O5)-5(SiO2) | |
| Dual Oxide Dopant Magnetic Layer | 63 |
| Underlayer III | |
| Underlayer II | 61 |
| Underlayer I | |
| Seed layer II | 59 |
| Seed layer I | |
| SUL | 55 |
| Ru | 57 |
| SUL | 55 |
| Adhesion | 53 |
| Sub | 51 |

FIG. 3

PERPENDICULAR RECORDING MEDIA WITH SUBLAYERS OF OXIDE DOPANT MAGNETIC MATERIALS

BACKGROUND OF THE INVENTION

1. Technical Field

The present invention relates in general to perpendicular recording media, including continuous and patterned recording media, and in particular, to an improved system, method and apparatus for perpendicular recording media with sublayers of dual oxide dopant magnetic materials.

2. Description of the Related Art

Hard disk drives provide data storage for data processing systems in computers and servers. Disk drives are also becoming increasingly pervasive in media players, digital recorders, and other personal devices. Advances in disk drive technology have made it possible for a user to store an immense amount of digital information on an increasingly small disk, and to selectively retrieve and alter portions of such information almost instantaneously. Particularly, recent developments have simplified disk drive manufacturing while yielding increased track densities, thus promoting increased data storage capabilities at reduced costs.

Hard disk drives rotate high precision media, such as an aluminum or glass disk coated on both sides with thin films, to store information in the form of magnetic patterns. Electromagnetic read/write heads suspended or floating only fractions of micro inches above the disk are used to either record information onto the thin film media, or read information from it.

A read/write head may write information to the disk by creating an electromagnetic field to orient a cluster of magnetic grains, known as a bit, in one direction or the other. In longitudinal magnetic recording media applications, a magnetic recording layer has a magnetic c-axis (or easy axis) parallel to the disk plane. As the disk drive industry is transitioning to perpendicular recording technology, adjustments are being made to adapt the disk media so that the magnetic easy axis (crystallographic c-axis) of the cobalt alloy recording layers grow perpendicular to the disk plane. Hexagonal Close Packed (HCP) cobalt alloys are typically used as a magnetic recording layer for perpendicular recording. Some media manufacturers rely on a cobalt alloy with the incorporation of an oxide segregant to promote the formation of small and uniform grains.

To read information, magnetic patterns detected by the read/write head are converted into a series of pulses that are sent to the logic circuits to be converted to binary data and processed by the rest of the system. To write information, a write element located on the read/write head generates a magnetic write field that travels vertically through the magnetic recording layer and returns to the write element through a soft underlayer. In this manner, the write element magnetizes vertical regions, or bits, in the magnetic recording layer. Because of the easy axis orientation, each of these bits has a magnetization that points in a direction substantially perpendicular to the media surface. To increase the capacity of disk drives, manufacturers are continually striving to reduce the size of bits and the grains that comprise the bits.

The ability of individual magnetic grains to be magnetized in one direction or the other, however, poses problems where grains are extremely small. The superparamagnetic effect results when the product of a grain's volume (V) and its anisotropy energy ($K_u$) fall below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect. To maintain thermal stability of the magnetic grains, material with high $K_u$ may be used for the magnetic layer. However, material with a high $K_u$ requires a stronger magnetic field to reverse the magnetic moment. Thus, the ability of the write head to write on magnetic material may be reduced where the magnetic layer has a high $K_u$ value.

As shown in FIG. 1, the perpendicular magnetic recording medium 11 is generally formed with a substrate 13, adhesion 15, a soft magnetic underlayer(s) (SUL) 17, a seed layer(s) 19, an underlayer(s) 21, one or more magnetic layers 23, and one or more protective layers 25 for protecting the surface of the perpendicular magnetic recording layer. The perpendicular magnetic recording layer 27 itself comprises a single oxide dopant magnetic layer 27a, and a dual oxide dopant magnetic layer 27b. The performance of the recording layer is important for efficient recording.

Accordingly, a need exists for a practical, attainable apparatus, system, and method for improving the perpendicular magnetic recording layer. Beneficially, such an apparatus, system and method would increase the recording performance of the system. Such apparatuses, systems and methods are disclosed and claimed herein. Further, the perpendicular magnetic recording layers should be able to resist corrosion.

SUMMARY OF THE INVENTION

Embodiments of a system, method, and apparatus for perpendicular recording media with sublayers of dual oxide dopant magnetic materials are disclosed. New materials and media layer structures are used to achieve improvements in signal-to-noise ratios and reductions in soft error rates. Granular perpendicular magnetic recording media constructed in accordance with the invention comprises a magnetic layer with oxide dopant materials that form magnetic isolation among the grains in the media.

For example, the magnetic layer may comprise multiple sublayers of magnetic materials. In each sublayer, dual oxide dopants may be incorporated. The dual oxide dopants are typically, but not limited to, $Ta_2O_5$ and $SiO_2$. The compositions of the sublayers can be the same or different depending on the application. In other embodiments, the magnetic layer may be sputter-deposited using a target comprising a mixture of CoPtCrB and dual oxides as dopants. The layer sputter-deposited with such targets can be the entire magnetic layer or just a sublayer.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

FIG. 1 is a schematic sectional side view of a conventional recording media;

FIG. 2 is a schematic sectional side view of one embodiment of a perpendicular recording media constructed in accordance with the invention;

FIG. 3 is a schematic sectional side view of another embodiment of a perpendicular recording media constructed in accordance with the invention.

DETAILED DESCRIPTION OF THE INVENTION

Figure 4:
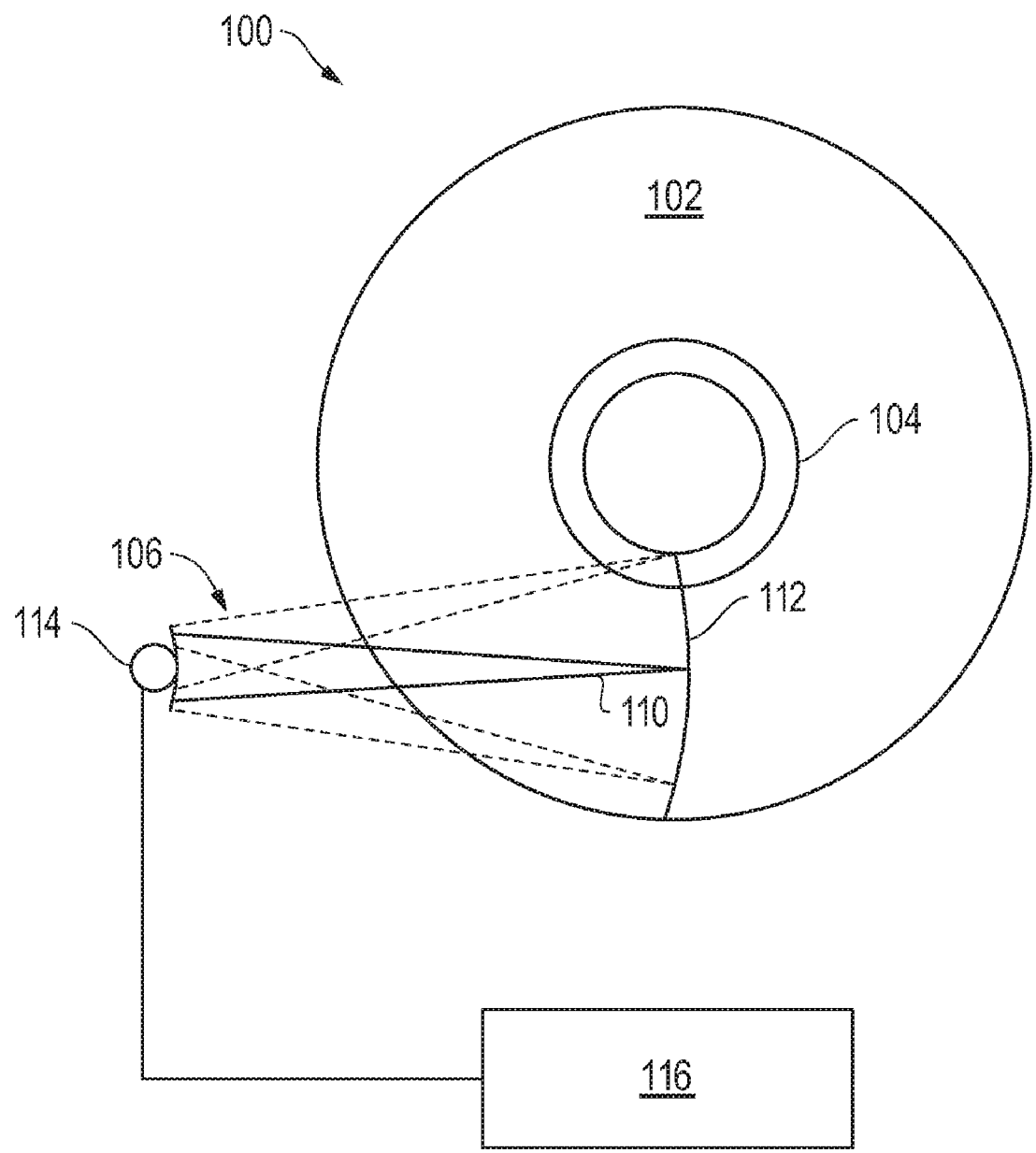
FIG. 4 is a schematic diagram of an embodiment of a hard disk drive constructed in accordance with the invention.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

For example, two embodiments of media layer structures are illustrated in FIGS. 2 and 3, and a conventional design is shown in FIG. 1 (previously described). One aspect of the invention with respect to conventional designs is the utilization of a magnetic layer that may be formed (e.g., sputter-deposited) with boron-doped, dual oxide dopant magnetic materials (see, e.g., FIG. 3). The combination of B-doping and dual oxide dopants provides improved magnetic isolation among the grains of the media. As a result, the media's signal-to-noise ratio is improved and its soft error rate is reduced.

In the embodiment of FIG. 2, a perpendicular recording media 30 comprises a substrate 31, and an adhesion layer 33 adjacent to or on the substrate 31. At least one soft underlayer (SUL) 35 (e.g., two) may be formed on the adhesion layer, with or without a layer 37 of Ru therebetween. At least one seed layer 39 (e.g., two) may be formed on said at least one SUL 35. At least one underlayer 41 (e.g., three) may be formed on said at least seed layer 39. The magnetic layer comprises at least two sublayers 43 of dual oxide dopant magnetic materials.

The media 30 may further comprise an exchange control layer (ECL) 45 on one of said at least two dual oxide dopant magnetic materials 43. With the Exchange Control Layer or "ECL," the perpendicular magnetic recording media is typically called an Exchange Coupled Composite (ECC) or Exchange Spring Layer (ESL). Without the ECL, the perpendicular magnetic recording media is typically called "capped media." The media 30 may still further comprise a magnetic layer of CoPtCrB 47, which contains no oxide dopant, on the ECL 45, and one or more protective carbon overcoats 49 on the CoPtCrB layer 47.

The sublayers 43 of dual oxide dopant magnetic materials may be of a same composition or different compositions. For example, the sublayers of dual oxide dopant magnetic materials may comprise at least one of $Ta_2O_5$ and $SiO_2$. One or both of the sublayers of dual oxide dopant magnetic materials also may comprise $CoPt_{18}Cr_{18}$-1($Ta_2O_5$)-5($SiO_2$). In some embodiments, $Ta_2O_5$ may comprise a range of about 0.5 to 3 molecular percent, and $SiO_2$ may comprise a range of about 3 to 8 molecular percent. Furthermore, the at least one SUL may comprise a pair of SULs with a Ru layer therebetween, the at least one seed layer may comprise a pair of seed layers, and the at least one underlayer may comprise three underlayers.

As indicated in the following table (TABLE 1), the recording performance of media constructed in accordance with the invention shows a 0.3 to 0.4 order improvement in soft error rate (SER), with better overwrite (OW) and comparable adjacent track interference (ATI).

TABLE 1

|  | SER AF (after adapted format) | OW | ATI |
| --- | --- | --- | --- |
| Prior art | −3.48 | 29.5 | 0.46 |
| Embodiment 1 | −3.78 | 31.4 | 0.44 |
| Embodiment 2 | −3.85 | 31.9 | 0.40 |

In the embodiment of FIG. 3, the perpendicular recording media 50 may comprise a substrate 51, and an adhesion layer 53 adjacent to or on the substrate 51. At least one soft underlayer (SUL) 55 may be formed on the adhesion layer, with or without a layer 57 of Ru therebetween. At least one seed layer 59 may be formed on said at least one SUL 55. At least one underlayer 61 may be formed on said at least one seed layer. The magnetic layer comprises at least two sublayers 63 of dual oxide dopant magnetic materials. Optionally, the media 50 may further comprise an exchange control layer (ECL) 65 on the dual oxide dopant magnetic materials 63. The media 50 may still further comprise a magnetic layer of CoPtCrB 67, which contains no oxide dopant, on the ECL 65, and one or more protective carbon overcoat layers 69 on the CoPtCrB layer 67.

In some embodiments, the at least two sublayers of dual oxide dopant magnetic materials comprise a boron-doped dual oxide dopant magnetic alloy. The sublayers of dual oxide dopant magnetic materials may be of a same composition or different compositions. At least one of the sublayers of dual oxide dopant magnetic materials may comprise B and at least one of $Ta_2O_5$ and $SiO_2$. In some embodiments, B may comprise a range of about 1 to 5 atomic percent, $Ta_2O_5$ may comprise a range of about 0.5 to 3 molecular percent, and $SiO_2$ may comprise a range of about 3 to 8 molecular percent.

In one embodiment, one or both of the sublayers of dual oxide dopant magnetic materials comprise $CoPt_{18}Cr_{17}B_3$-1($Ta_2O_5$)-5($SiO_2$). In other embodiments, the SUL comprises a pair of SULs and a Ru layer therebetween, the at least one seed layer comprises a pair of seed layers, and the at least one underlayer comprises three underlayers. At least a portion of or both of the sublayers of dual oxide dopant magnetic materials may be sputter-deposited.

As indicated in the following table (TABLE 2), the recording performance of media constructed in accordance with the invention shows a 0.4 order improvement in soft error rate (SER), with better overwrite (OW).

TABLE 2

|  | SER AF (after adapted format) | 2TSNR (total) | OW |
| --- | --- | --- | --- |
| Prior art | −3.10 | 13.71 | 28.19 |
| This embodiment | −3.51 | 14.03 | 30.96 |

Referring to FIG. 4, a diagram of a hard disk drive assembly 100 constructed in accordance with the invention is shown. A hard disk drive assembly 100 generally comprises one or more hard disks comprising a perpendicular magnetic recording media 102, rotated at high speeds by a spindle motor (not shown) during operation. The magnetic recording media 102 will be more fully described herein. Concentric data tracks 104 formed on either or both disk surfaces receive and store magnetic information.

A read/write head 110 may be moved across the disk surface by an actuator assembly 106, allowing the head 110 to read or write magnetic data to a particular track 104. The actuator assembly 106 may pivot on a pivot 114. The actuator assembly 106 may form part of a closed loop feedback system, known as servo control, which dynamically positions the read/write head 110 to compensate for thermal expansion of the perpendicular magnetic recording media 102 as well as vibrations and other disturbances. Also involved in the servo control system is a complex computational algorithm executed by a microprocessor, digital signal processor, or analog signal processor 116 that receives data address information from an associated computer, converts it to a location on the perpendicular magnetic recording media 102, and moves the read/write head 110 accordingly.

Specifically, read/write heads 110 periodically reference servo patterns recorded on the disk to ensure accurate head 110 positioning. Servo patterns may be used to ensure a read/write head 110 follows a particular track accurately, and to control and monitor transition of the head 110 from one track 104 to another. Upon referencing a servo pattern, the read/write head 110 obtains head position information that enables the control circuitry 116 to subsequently realign the head 110 to correct any detected error.

Servo patterns may be contained in engineered servo sectors 112 embedded within a plurality of data tracks 104 to allow frequent sampling of the servo patterns for optimum disk drive performance. In a typical perpendicular magnetic recording media 102, embedded servo sectors 112 extend substantially radially from the perpendicular magnetic recording media 102 center, like spokes from the center of a wheel. Unlike spokes however, servo sectors 112 form a subtle, arc-shaped path calibrated to substantially match the range of motion of the read/write head 110.

This written description uses examples to disclose the invention, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. While the invention has been shown or described in only some of its forms, it should be apparent to those skilled in the art that it is not so limited, but is susceptible to various changes without departing from the scope of the invention.

We claim:

1. A perpendicular recording media, comprising:
a substrate;
an adhesion layer adjacent the substrate;
at least one soft underlayer (SUL) on the adhesion layer;
at least one seed layer on said at least one SUL;
at least one underlayer on said at least seed layer;
at least two sublayers of dual oxide dopant magnetic materials of a magnetic recording layer on the at least one underlayer; and
said at least two sublayers of dual oxide dopant magnetic materials comprise B and both of $Ta_2O_5$ and $SiO_2$, B comprises a range of about 1 to 5 atomic percent, $Ta_2O_5$ comprises a range of about 0.5 to 3 molecular percent, and $SiO_2$ comprises a range of about 3 to 8 molecular percent.

2. A perpendicular recording media according to claim 1, wherein said at least two sublayers of dual oxide dopant magnetic materials comprise a same composition.

3. A perpendicular recording media according to claim 1, wherein said at least two sublayers of dual oxide dopant magnetic materials comprise different compositions.

4. A perpendicular recording media according to claim 1, wherein said at least two sublayers of dual oxide dopant magnetic materials comprise $CoPt_{18}Cr_{17}B_3$-1($Ta_2O_5$)-5($SiO_2$).

5. A perpendicular recording media according to claim 1, wherein each of said at least two sublayers of dual oxide dopant magnetic materials comprises $CoPt_{18}Cr_{17}B_3$-1($Ta_2O_5$)-5($SiO_2$).

6. A perpendicular recording media according to claim 1, wherein at least a portion of said at least two sublayers of dual oxide dopant magnetic materials is sputter-deposited.

7. A perpendicular recording media according to claim 1, wherein each of said at least two sublayers of dual oxide dopant magnetic materials is sputter-deposited.

8. A perpendicular recording media according to claim 1, wherein said at least two sublayers of dual oxide dopant magnetic materials comprise $CoPt_{18}Cr_{18}$-1($Ta_2O_5$)-5($SiO_2$).

9. A perpendicular recording media according to claim 1, further comprising:
an exchange control layer (ECL) on one of said at least two dual oxide dopant magnetic materials;
a layer of CoPtCrB on the ECL; and
a carbon overcoat on the CoPtCrB layer.

10. A perpendicular recording media according to claim 1, wherein the SUL comprises a pair of SULs and a Ru layer therebetween, and the at least one seed layer comprises a pair of seed layers.

11. A perpendicular recording media according to claim 1, wherein the at least one underlayer comprises three underlayers.

12. A perpendicular recording media, comprising:
a substrate;
an adhesion layer on the substrate;
at least one soft underlayer (SUL) on the adhesion layer;
at least one seed layer on said at least one SUL;
at least one underlayer on said at least seed layer;
at least two sublayers of dual oxide dopant magnetic materials of a magnetic recording layer on the at least one underlayer, wherein said at least two sublayers of dual oxide dopant magnetic materials comprise $CoPt_{18}Cr_{18}$-1($Ta_2O_5$)-5($SiO_2$);
an exchange control layer (ECL) on one of said at least two dual oxide dopant magnetic materials;
a layer of CoPtCrB on the ECL, wherein B comprises a range of about 1 to 5 atomic percent; and
a carbon overcoat on the CoPtCrB layer.

13. A perpendicular recording media according to claim 12, wherein said at least two sublayers of dual oxide dopant magnetic materials comprise a same composition.

14. A perpendicular recording media according to claim 12, wherein the at least one SUL comprises a pair of SULs and a Ru layer therebetween, the at least one seed layer comprises a pair of seed layers, and the at least one underlayer comprises three underlayers.

15. A hard disk drive, comprising:
a magnetic media comprising:
a substrate;
an adhesion layer on the substrate;
at least one soft underlayer (SUL) on the adhesion layer;
at least one seed layer on said at least one SUL;
at least one underlayer on said at least seed layer;

at least two sublayers of dual oxide dopant magnetic materials of a magnetic recording layer on the at least one underlayer, at least one of said at least two sublayers of dual oxide dopant magnetic materials comprise B and both of $Ta_2O_5$ and $SiO_2$, wherein B comprises a range of about 1 to 5 atomic percent, $Ta_2O_5$ comprises a range of about 0.5 to 3 molecular percent, and $SiO_2$ comprises a range of about 3 to 8 molecular percent; and an actuator movable relative to the magnetic media and having a read head for reading data from the magnetic media.

16. A hard disk drive according to claim 15, wherein said at least two sublayers of dual oxide dopant magnetic materials comprise one of a same composition and different compositions.

17. A hard disk drive according to claim 15, wherein each of said at least two sublayers of dual oxide dopant magnetic materials comprises $CoPt_{18}Cr_{17}B_3$-1($Ta_2O_5$)-5($SiO_2$).

18. A hard disk drive according to claim 15, further comprising:

an exchange control layer (ECL) on one of said at least two dual oxide dopant magnetic materials of the magnetic recording layer;

a layer of CoPtCrB on the ECL; and a carbon overcoat on the CoPtCrB layer; and wherein the SUL comprises a pair of SULs and a Ru layer therebetween, the at least one seed layer comprises a pair of seed layers, and the at least one underlayer comprises three underlayers.

\* \* \* \* \*